United States Patent

[11] 3,587,045

[72] Inventors Nobuyuki Tanaka
Yokohama-shi;
Naoki Morimoto, Kawasaki-shi, both of, Japan

[21] Appl. No. 680,562
[22] Filed Nov. 3, 1967
[45] Patented June 22, 1971
[73] Assignee Fujitsu Limited
Kawasaki, Japan
[32] Priority Nov. 10, 1966
[33] Japan
[31] 41/74011

[54] SYSTEM FOR EXTRACTING FEATURES OF LINES OF A PATTERN
1 Claim, 33 Drawing Figs.

[52] U.S. Cl. .......... 340/146.3AE
[51] Int. Cl. .......... G06k 9/10
[50] Field of Search .......... 340/146.3; 178/7.2; 235/189

[56] References Cited

UNITED STATES PATENTS

| | | | |
|---|---|---|---|
| 3,268,864 | 8/1966 | Kubo et al. | 340/146.3 |
| 3,273,124 | 9/1966 | Greanias | 340/146.3 |
| 3,297,988 | 1/1967 | Greanias et al. | 340/146.3 |
| 3,366,735 | 1/1968 | Hecker | 340/146.3 X |
| 3,426,325 | 2/1969 | Partin et al. | 340/146.3 |

*Primary Examiner*—Maynard R. Wilbur
*Assistant Examiner*—Leo H. Boudreau
*Attorneys*—Curt M. Avery, Arthur E. Wilfond, Herbert L. Lerner and Daniel J. Tick

ABSTRACT: A pattern is moved with respect to a plurality of linearly positioned detecting elements. A first circuit connected to the detecting elements derives the output signals of the detecting elements as scanning signals for the direction of movement of the pattern. A switch circuit coupled to the detecting elements provides scanning for a direction at right angles to the direction of movement of the pattern by cyclically switching the scanning signals at high speeds. Wave analyzers are connected to the first circuit and to the switch circuit for detecting the increases and decreases of the scanning signals. A second circuit coupled to the wave analyzer combines the output signals of the wave analyzer and determines the slopes of lines constituting the pattern.

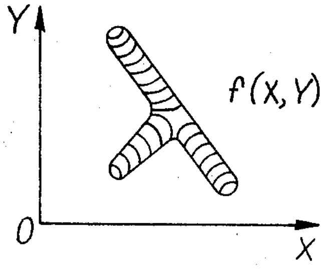
FIG. 1
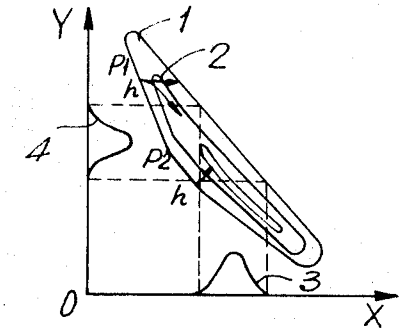
FIG. 2
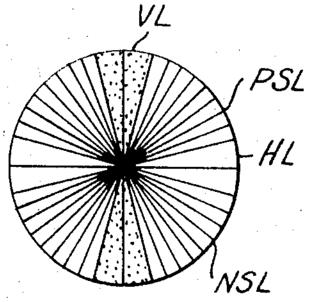
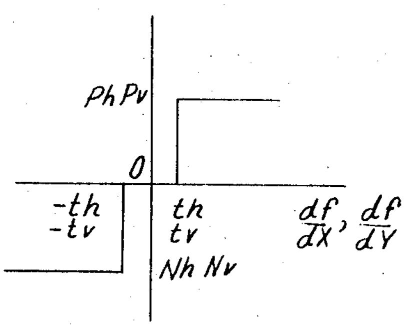
FIG. 4 FIG. 3

SYSTEM FOR EXTRACTING FEATURES OF LINES OF A PATTERN

DESCRIPTION OF THE INVENTION

The present invention relates to a pattern indicating system. More particularly, the invention relates to a pattern indicating system and a method of indicating the configuration of a pattern of line segments. In a conventional pattern indicating system, the readout or scanning signals are converted to digital signals "1" and "0" and the entire pattern or part thereof is stored in memory and the slope of a line segment is determined and then classified by complex and complicated logical operations. The pattern indicating system of the present invention is far superior to the conventional system, since the system of the invention indicates the slope of the analog readout signal and classifies the slope of the line segment by very simple operation.

The principal object of the present invention is to provide a new and improved pattern indicating system. The pattern indicating system of the present invention indicates patterns such as, for example, letters, numbers, handwritten and printed characters, and other recorded handwritten and printed designs and configurations, and the like, with high precision, effectiveness, efficiency and reliability. The pattern indicating system of the present invention is highly effective in indicating the characteristics of the line segments of the pattern continuously as the pattern is passed continuously under the readout head. The pattern indicating system of the present invention eliminates the need for a memory. The pattern indicating system of the present invention is effective in operation with patterns having curved lines and curved line segments, as well as with patterns having straight lines and straight line segments. The pattern indicated may be of polygonal configuration. The pattern indicating system of the present invention effectively eliminates redundant information.

In accordance with the present invention, a pattern indicating system which indicates the configuration and characteristics of a pattern comprises a scanner for scanning the pattern and providing scanning signals in accordance with the scanned configuration of the pattern. A line classifier connected to the scanner detects specified slopes of the pattern in accordance with the scanning signals and classifies the configuration of the pattern in accordance with the detected specified slopes.

The pattern comprises a plurality of line segments and the system comprises a differentiator connected between the scanner and the line classifier for differentiating the scanning signals. The detected specified slopes are determined by the positive and negative slopes of the differentiated scanning signals.

In accordance with the present invention, a method of indicating the configuration of a pattern comprises detecting specified slopes of the pattern. The configuration of the pattern is classified in accordance with the detected specified slopes. Signals corresponding to the detected specified slopes are differentiated and the positive and negative slopes of the differentiated signals are classified.

In order that the present invention may be readily carried into effect, it will now be described with reference to the accompanying drawings, wherein:

FIG. 1 is a schematic diagram of a pattern of line segments;

FIG. 2 is a schematic diagram of another pattern of line segments for explaining the principle of the present invention;

FIG. 3 is a schematic diagram explaining the operation of a quantizer for the scanning signals;

FIG. 4 is a schematic diagram illustrating the different classifications of the slope of a line segment of a pattern;

Figure 5:
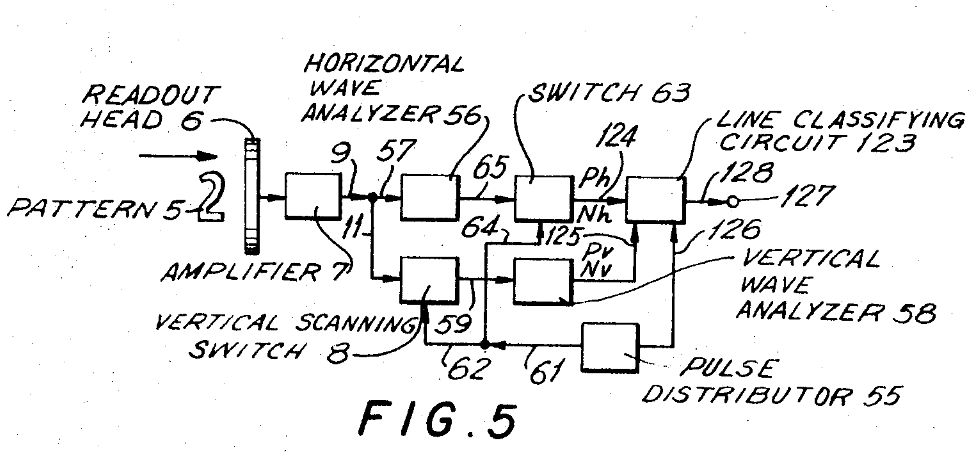
FIG. 5 is a block diagram of an embodiment of the pattern indicating system of the present invention.
Figure 7:
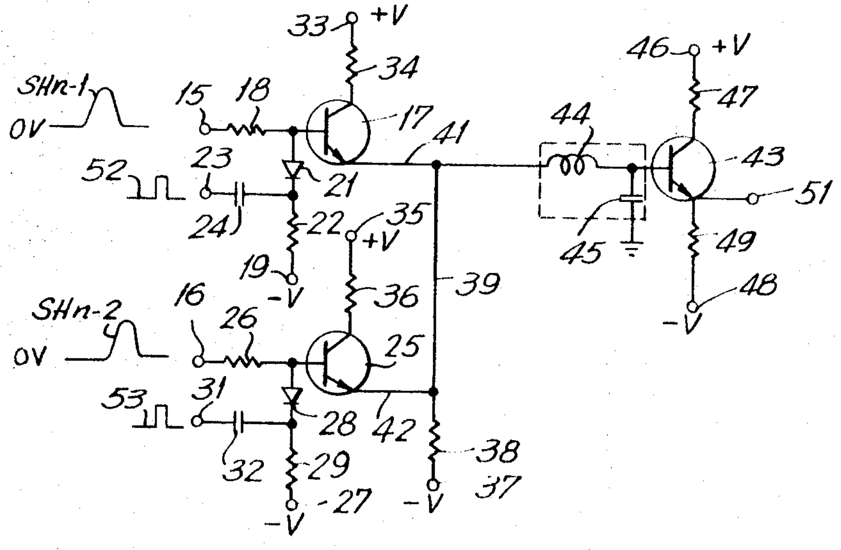
Figure 8A:
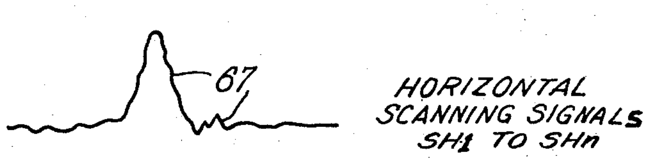
Figure 9:
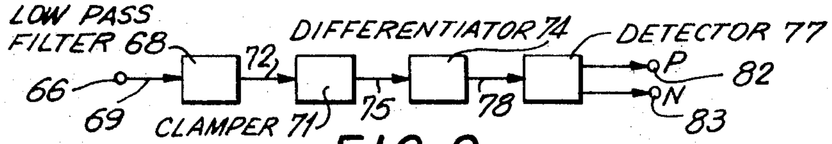
Figure 10:
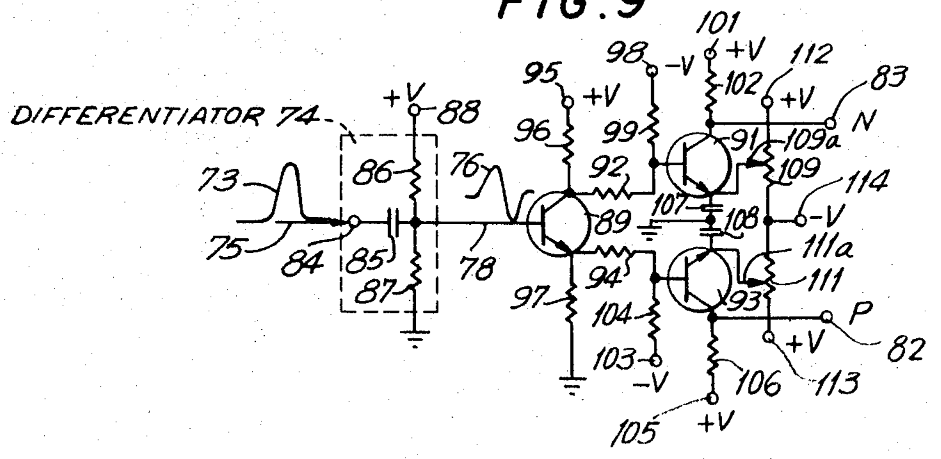
Figure 11:
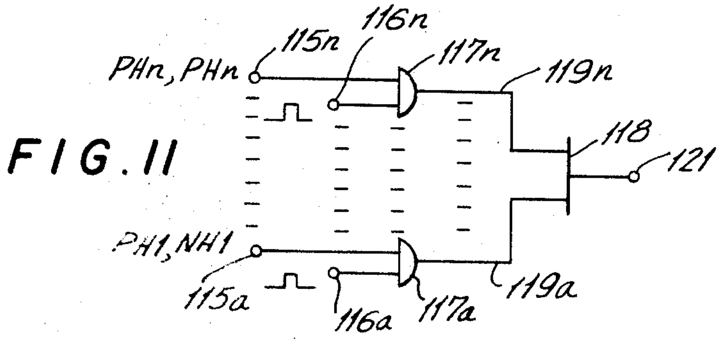
Figure 12:
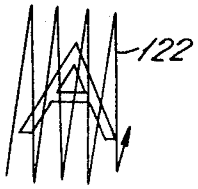
Figure 13A:
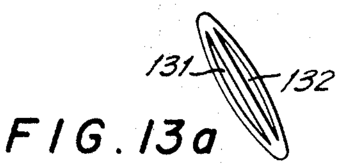
Figure 13B:
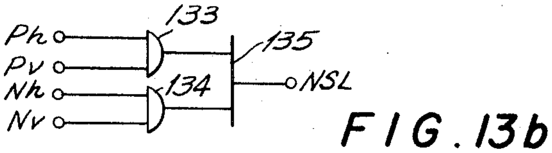
Figure 14A:
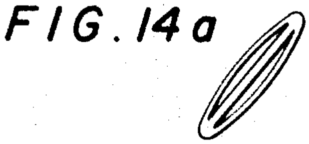
Figure 14B:
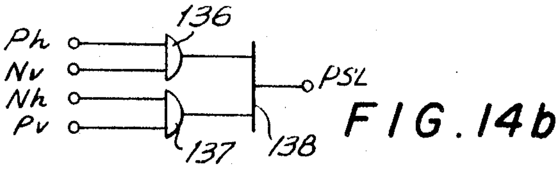
Figure 15A:
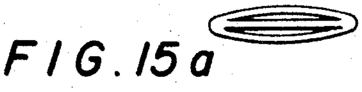
Figure 15B:
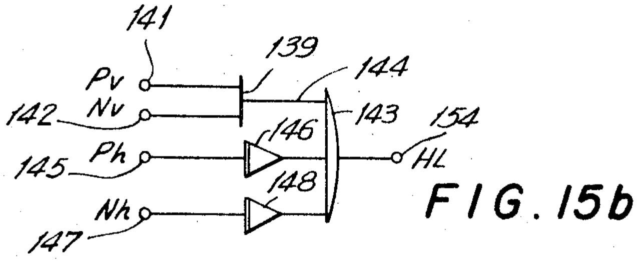
Figure 16A:
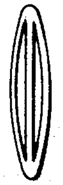
Figure 16B:
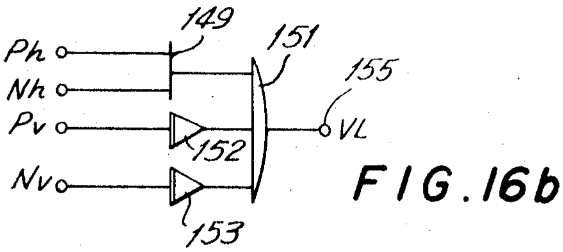
Figure 17A:
Figure 17B:
Figure 17C:
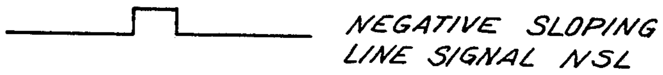
Figure 17D:
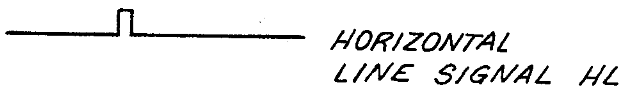
Figure 17E:
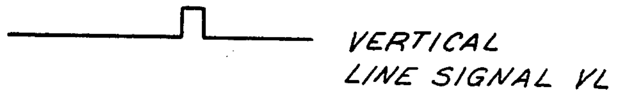
Figure 18:
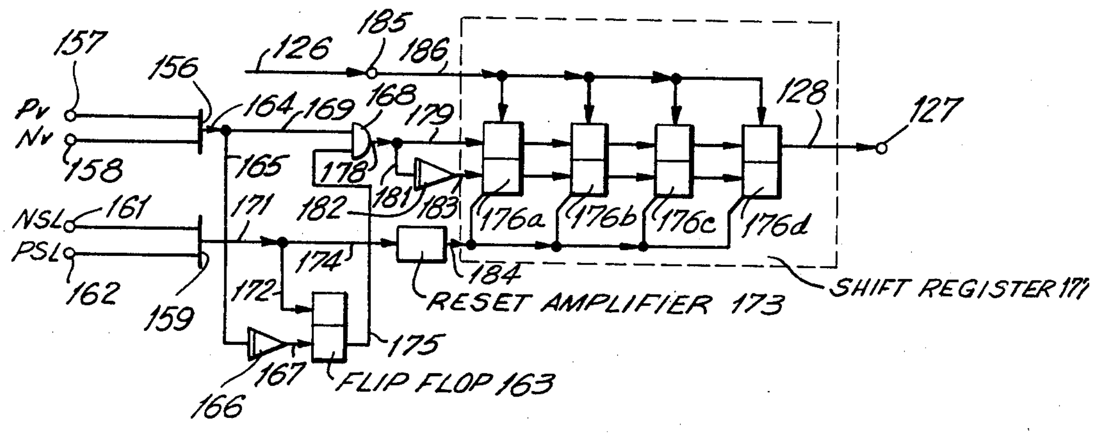

FIGS. 6*a*, 6*b*, 6*c* and 6*d* are schematic diagrams explaining the operation of the readout head of the system of FIG. 5;

FIG. 7 is a circuit diagram of an embodiment of vertical scanning switch which may be utilized as the vertical scanning switch of the system of FIG. 5;

FIGS. 8*a*, *b*, 8*c*, 8*d* and 8*e* are graphical presentations of the waveforms in the horizontal wave analyzer of the system of FIG. 5;

FIG. 9 is a block diagram of an embodiment of the horizontal wave analyzer of the system of FIG. 5;

FIG. 10 is a circuit diagram of an embodiment of the differentiator and the detector of the horizontal wave analyzer of FIG. 9;

FIG. 11 is a block diagram of an embodiment of a switch which may be utilized as the switch 63 of FIG. 5;

FIG. 12 is a schematic diagram of a pattern and a superimposed scanning line pattern;

FIGS. 13*a* and 13*b* are schematic diagrams of a pattern having a negative sloping line and a circuit for indicating such negative sloping line;

FIGS. 14*a* and 14*b* are schematic diagrams of a pattern having a positive sloping line and a circuit for indicating such positive sloping line;

FIGS. 15*a* and 15*b* are schematic diagrams of a pattern having a horizontal line and a circuit for indicating such horizontal line;

FIG. 16*a* and 16*b* are schematic diagrams of a pattern having a vertical line and a circuit for indicating such vertical line;

FIGS. 17*a*, 17*b*, 17*c*, 17*d* and 17*e* are graphical presentations of the waveforms in the switching circuits of FIGS. 15*b* and 16*b*; and FIG. 18 is a block diagram of an embodiment of the line classifying circuit of the system of FIG. 5.

In the present disclosure, a pattern comprising a plurality of line segments is defined as a planar function of $X$ and $Y$. The pattern is thus expressed as $f(X,Y)$ in an $X$, $Y$, plane.

In FIG. 1, the pattern is a function, $f$X,Y), in an $X$, $Y$ plane. A positive signal is proportional to the darkness intensity of the line segments of the pattern and a zero signal indicates a blank or white area without a line segment. When a pattern such as, for example, a letter, number, handwritten or printed character, other recorded handwritten and printed design or designs, or the like, has a uniform darkness or blackness and is on a white background, $f(X,Y)$ is zero on the white background and $f(X,Y)$ has a constant positive magnitude on the inked, printed, or the like, dark portion which is proportional to the intensity of the darkness or blackness. At the boundaries of the pattern, $f(X,Y)$ is discontinuous.

Usually, however, there is considerable variation of intensity of blackness or darkness of a pattern, whether it be typed, line-printed, handwritten, or otherwise printed. The boundary between black and white is not clearly defined, and varies. Furthermore, since a readout head generally is of finite size, it always has some degree of aperture distortion, so that even if the pattern or character is ideal in the quality of uniformity of darkness and definition of boundaries, the readout signal varies gradually and continuously.

The scanning signals or readout signals provided by the readout head may be considered to comprise a plurality of gradual curves, as shown in FIG. 1. This is an especially valid assumption when the aperture distortion is considered due to a very large readout surface. Signal noise in the readout or scanning signals due to smudges, extraneous marks and indistinct boundaries may be compensated for by averaging.

The direction of the slope of a line or line segment is equivalent to the direction of the normal to such line, so that the direction of the normal to the line may be determined by point scanning the pattern in two different directions such as, for example, the $X$ and $Y$ directions in FIG. 1, and measuring the variation of the intensity of black in such two directions.

In FIG. 2, which explains the principle of the present invention, a pattern 1 is shown in an $X$, $Y$ plane. The pattern 1 is divided by contour lines 2 in order to facilitate the description of the invention. When P1 is the point of observation, the variation of intensity of the darkness or blackness of the pattern 1 is measured in the $X$ and $Y$ directions. The vector $$v=k\left(\frac{df}{dX},\frac{df}{dY}\right)$$

where $k$ is a positive constant, is directed to the steepest gradient line meeting the contour line starting at the point P1 at right angles.

When the point of observation is close to the center of the pattern such as, for example, the point P2, the vector is directed to the normal of the steepest gradient line. When the pattern is scanned in the $X$ and $Y$ directions, the scanning or readout signals at the point P2 vary as shown by the waveforms 3 and 4 in FIG. 2. The shapes of the waveforms 3 and 4 vary as the slope of the line or line segment varies. The waveform of the scanning or readout signal is steep when the line is scanned at an angle close to 90° and is more gradual when the line is scanned at an angle close to parallel with said lire.

The increase and decrease of slope of the waveforms of the readout or scanning signals may be detected by a quantizer having the characteristic of FIG. 3. If such a quantizer is utilized and the increases and decreases are combined, the various lines of the pattern may be classified as any of a horizontal line HL, a vertical line VL, a positive sloping line PSL and a negative sloping line NSL, as shown in FIG. 4.

At the point of observation P2 of FIG. 2, both scanning or readout signals in $X$ and $Y$ directions having steep increasing portions and the rate of variation of both waveforms, in the $X$ and $Y$ directions, exceeds the threshold levels $th$ and $tv$ of FIG. 3. Since the threshold levels $th$ and $tv$ of FIG. 3 are in the quantizer, the output signals indicating the increasing portions of constant positive magnitudes P$h$ and P$v$ are provided at such portions.

At the observation point P1, however, the waveform of the scanning signal is gradual in the $Y$ direction and is steeply increasing in the $X$ direction. The rate of variation of the waveform in the $Y$ direction thus does not exceed the threshold level $tv$ (FIG. 3). Such rate of variation is zero. The rate of variation of the waveform in the $X$ direction exceeds the threshold level $th$ so that a signal of constant positive magnitude P$h$ is provided by the detector or quantizer.

When the point of observation is on the front or leading edge of a negative sloping line NSL, constant positive magnitudes P$h$ and P$v$ are provided. When the point of observation is on the front or leading edge of a nearly vertical line, only the constant positive magnitude P$h$ is provided and P$v$ is zero. These principles are also applicable when the point of observation is on a line segment of other position or inclination.

The inclination or position of the line or line segment of the pattern on which the point of observation lies may thus be determined by combining the increasing and decreasing detector signals in the horizontal and vertical directions, as hereinbefore described. The quantizing of the waveform of the scanning signal may be readily subdivided to provide finer and more precise analysis and classification of each line into more parts.

FIG. 5 is an embodiment of the pattern indicating system of the present invention. In FIG. 5, the pattern indicating system classifies the lines of a pattern of line segments into any of the four classifications of horizontal line HL, vertical line VL, positive sloping line PSL and negative sloping line NSL.

In FIG. 5, a pattern 5 is passed under a readout head 6 at a constant speed. The readout head 6 comprises a plurality of photocells or photosensitive cells arranged in a determined pattern such as, for example, in a straight line. Each photocell of the readout head 6 provides an electric current which is proportional to the light reflected from the portion of the pattern then under said readout head.

The current provided by the readout head 6 is amplified by an amplifier 7. If there are $n$ photocells in the readout head 6, the amplifier 7 amplifies the current from each of the photocells to an equal extent. The amplifier 7 is adjusted so that when white is scanned by the readout head 6, the output of said amplifier is zero volts. The photocells of the readout head 6 thus provide horizontal scanning or readout signals SH1 to SH$n$ in succession.

FIGS. 6$a$, 6$b$, 6$c$ and 6$d$ explain the operation of the readout head 6. If the horizontal scanning signals SH1 to SH$n$ are switched successively, vertical scanning signals may be derived therefrom. A vertical scanning switch 8 has an input connected to the output of the amplifier 7 via leads 9 and 11. The vertical scanning switch 8 successively switches the horizontal scanning signals SH1 to SH$n$.

In FIGS. 6$a$, 6$b$, 6$c$ and 6$d$, it is assumed that the photocells C1, C2..... C$n$ scan a pattern 12, shown in broken lines. The horizontal scanning signals SH1 to SH$n$ vary in waveform as indicated by the cross-sectional areas of FIG. 6$b$. If the horizontal scanning signals SH1 to SH$n$ are successively switched in the vertical scanning switch 8 in the order SH1, SH2, s$h$3...SH$n$, SH1, SH2, SH3... ,switching pulses 13 (FIG. 6$b$) aid in the switching of the horizontal scanning signals. Signals of waveform 14, shown in FIG. 6$c$, are provided. If the speed of switching is sufficiently rapid relative to the speed of movement of the pattern 12 in the horizontal direction, the signals 14 represent or correspond to fine vertical direction scanning of said pattern.

FIG. 7 is a vertical scanning switch circuit which may be utilized as the vertical scanning switch 8 of FIG. 5. In order to simplify the explanation of the operation of the vertical scanning switch 8 of FIG. 5, only two horizontal scanning signals SH$n$−1 and SH$n$−2 are assumed to be supplied as inputs to said vertical scanning switch. The horizontal scanning signal SH$n$−1 is supplied to an input terminal 15 and the horizontal scanning signal SH$n$−2 is supplied to an input terminal 16.

In FIG. 7, the input terminal 15 is connected to the base electrode of a first transistor 17 via a resistor 18. The base electrode of the first transistor 17 is connected to a terminal 19 via the series connection of a diode 21 and a resistor 22. An input terminal 23 is connected to a common point in the connection between the diode 21 and the resistor 22 via a capacitor 24. A negative bias voltage is applied to the terminal 19 from any suitable source of DC voltage.

The input terminal 16 is connected to the base electrode of a second transistor 25 via a resistor 26. The base electrode of the second transistor 25 is connected to a terminal 27 via the series connection of a diode 28 and a resistor 29. An input terminal 31 is connected to a common point in the connection between the diode 28 and the resistor 29 via a capacitor 32. A negative bias voltage is applied to the terminal 27 from any suitable source of DC voltage.

A positive bias voltage, from any suitable source of DC voltage, is applied to the collector electrode of the first transistor 17 via a terminal 33 and a resistor 34. A positive bias voltage, from any suitable source of DC voltage, is applied to the collector electrode of the second transistor 25 via a terminal 35 and a resistor 36. A negative bias voltage, from any suitable source of DC voltage, is applied to the emitter electrode of the first transistor 17 via a terminal 37, a resistor 3, a lead 39 and a lead 41, and to the emitter electrode of the second transistor 25 via said terminal, said resistor, the lead 39 and a lead 42.

The emitter electrode of the first transistor 17 is connected to the base electrode of a third transistor 43 via the lead 41 and an inductor 44. A capacitor 45 is connected between the base electrode of the third transistor 43 and a point at ground potential. A positive bias voltage, from any suitable source of DC voltage, is applied to the collector electrode of the third transistor 43 via a terminal 46 and a resistor 47. A negative bias voltage, from any suitable source of DC voltage, is applied to the emitter electrode of the third transistor 43 via a terminal 48 and a resistor 49. An output terminal 51 is connected to the emitter electrode of the third transistor 43.

Pulses 52 and 53 of positive polarity are supplied to input terminals 23 and 31, respectively, at the desired sampling times. In the following description, it is assumed that a positive pulse 52 is supplied to the input terminal 23 and that there is not positive pulse supplied to the input terminal 31. If the pulse 52 is of sufficient amplitude, the diode 21 is switched to its nonconductive condition. The base electrode of the first transistor 17 is proportional to the input pulse 52 and remains positive.

Since no positive pulse is supplied to the terminal 31, the diode 28 is switched to its conductive condition. The resistance value of each resistor 18 and 26, which is the same for each resistor, is selected so that the base electrode of the second transistor 25 is at a negative potential. The horizontal scanning signal SH*n*—1 therefore appears at the upper terminal of the resistor 38, which is connected in common to the emitter electrodes of the first and second transistors 17 and 25.

Figure 6A:
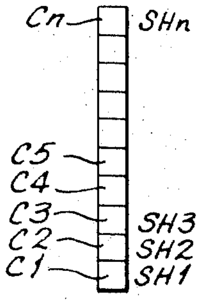
Figure 6B:
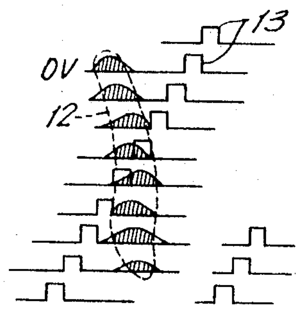
Figure 6C:
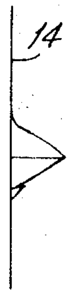
Figure 6D:
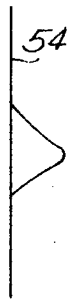

The same principle applies when the number of input terminals 23 and 31 is increased to *n* and positive pulses are successively supplied to such input terminals. Thus, vertical scanning signals 14, as shown in FIG. 6*c*, may be provided by supplying positive polarity sampling pulses to the input terminals such as 23 and 31 (FIG. 7) corresponding to the scanning signals 1, 2, 3,...*n*—2, *n*—1, *n*, 1, 2, 3,...*n*—2, *n*—1, *n*, and so on, cyclically. The resultant vertical scanning signal 14 of FIG. 6*c* is generally not sufficiently smooth, so that it is passed through a low pass filter, which provides a smooth vertical scanning signal 54, as shown in FIG. 6*d*.

In the system of FIG. 5, a pulse distributor 55 produces the switching pulses of the aforedescribed type such as, for example, the pulses 52 and 53. In FIG. 5, the horizontal scanning signals SH1 to SH*n* are supplied to the input of a horizontal wave analyzer 56 via the lead 9 and a lead 57. The vertical scanning signal 54 is supplied to the input of a vertical wave analyzer 58 via a lead 59. The pulse distributor 55 supplies switching pulses such as, for example, the pulses 52 and 53 of FIG. 7, to the input terminals such as, for example, the terminals 23 and 31 of FIG. 7, of the vertical scanning switch 8 (FIG. 5) via leads 61 and 62, and to input terminals of a switch 63 via the lead 61 and a lead 64. The output of the horizontal wave analyzer 56 is connected to an input of the switch 63 via a lead 65 (FIG. 5).

FIGS. 8*a*, 8*b*, 8*c*, 8*d* and *e* are graphical presentations of the waveforms in the horizontal wave analyzer 56 of FIG. 5. FIG. 9 illustrates the horizontal wave analyzer 56 of FIG. 5. FIG. 8*a* shows one of the horizontal wave scanning signals SH1 to SH*n* supplied to the input terminal 66 (FIG. 9) of the horizontal wave analyzer. The horizontal scanning signals SH1 to SH*n* include noise components 67, as shown in FIG. 8*a*, and such noise components must be removed in order to enable the correct or accurate determination or detection of the increase and decrease of the horizontal scanning signal.

Figure 8B:
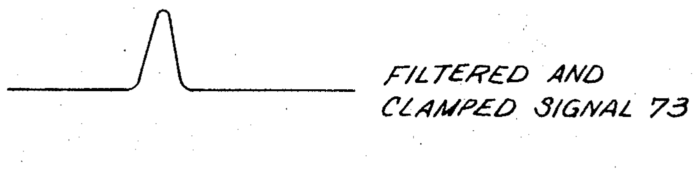

The input terminal 66 (FIG. 9) is connected to the input of a low pass filter 68 via a lead 69. The low pass filter 68 removes the noise components 67 of the horizontal scanning signal S*h* and supplies the filtered scanning signal to the input of a clamper 71 via a lead 72 (FIG. 9). The clamper 71 functions to eliminate the negative portions of the filtered scanning signal, so that a filtered and clamped signal 73, as shown in FIG. 8*b*, is supplied by the clamper 71 to the input of a differentiator 74 (FIG. 9) via a lead 75.

Figures 8C, 8D, 8E:
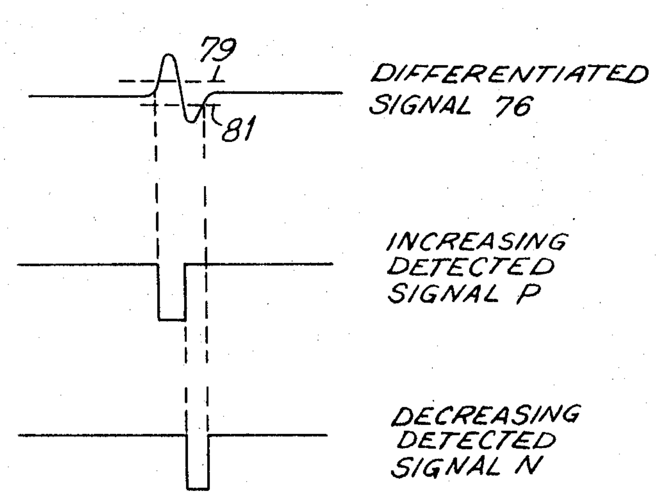

The differentiator 74 functions to differentiate the output signal 73 of the clamper 71 to produce a differentiated signal 76, as shown in FIG. 8*c*. The differentiated signal 76 produced by the differentiator 74 is supplied to the input of a detector 77 via a lead 78 (FIG. 9). The detector 77 functions to discriminate or detect the differentiated signal 76 by threshold levels 79 and 81 (FIG. 8*c*) and produces an increasing output or detected signal P and a decreasing output or detected signal N. The increasing output or detected signal P is shown in FIG. 8*d* and is provided at an output terminal 82 (FIG. 9) connected to an output of the detector 77. The decreasing output or detected signal —*N* is shown in FIG. 8*d* and is provided at an output terminal 83 (FIG. 9) connected to an output of the detector 77.

FIG. 10 shows a differentiator and detector which may be utilized in the wave analyzer of FIG. 9. In FIG. 10, the filtered and clamped signal 73 in the lead 75 is supplied to an input terminal 84, which is connected to a plate of a capacitor 85 of the differentiator 74. The other plate of the capacitor 85 is connected to a common point in the connection between a pair of resistors 86 and 87 which are connected in series between a terminal 88 and a point at ground potential. The differentiator 74 comprises the capacitor 85 and the resistors 86 and 87. The differentiated signal 76 produced by the differentiator 74 is supplied via the lead 78 to the base electrode of a first transistor 89 of the detector 77.

The collector electrode of the first transistor 89 is connected to the base electrode of a second transistor 91 via a resistor 92. The output terminal 83 is connected to the collector electrode of the second transistor 91. The emitter electrode of the first transistor 89 is connected to the base electrode of a third transistor 93 via a resistor 94. The output terminal 82 is connected to the collector electrode of the third transistor 93. The collector electrode of the first transistor 89 is connected to a terminal 95 via a resistor 96. The emitter electrode of the first transistor 89 is connected to a point at ground potential via a resistor 97.

The base electrode of the second transistor 91 is connected to a terminal 98 via a resistor 99. The collector electrode of the second transistor 91 is connected to a terminal 101 via a resistor 102. The base electrode of the third transistor 93 is connected to a terminal 103 via a resistor 104. The collector electrode of the third transistor 93 is connected to a terminal 105 via a resistor 106. The emitter electrodes of the second and third transistors 91 and 93 are connected to each other via a pair of series connected capacitors 107 and 108. A common point in the connection between the capacitors 107 and 108 is connected to a point at ground potential.

A pair of variable resistors 109 and 111 are connected in series between a pair of terminals 112 and 113. A common point in the connection between the variable resistors 109 and 111 is connected to a terminal 114. The movable contact electrode 109*a* of the variable resistor 109 is connected to the emitter electrode of the second transistor 91. The movable contact electrode 11*a* of the variable resistor 111 is connected to the emitter electrode of the third transistor 93. A suitable positive bias voltage is applied to each of the terminals 8, 95, 101, 112, 105 and 113 from any suitable source of DC voltage. A suitable negative bias voltage is applied to each of the terminals 98, 103 and 114 from any suitable source of DC voltage.

In FIG. 10, signals of opposite phase and equal amplitude are provided at the emitter and collector electrodes of the first transistor 89. The second transistor 91 detects the decreasing detected signal *N* and the third transistor detects the increasing detected signal *P*. The variable resistors 109 and 111 determine, by their setting, the threshold levels 79 and 81 (FIG. 8*c*).

If the vertical scanning signal 54 of FIG. 6*d* is supplied to the input terminal 84 of the circuit of FIG. 10, the increase and decrease of the vertical scanning signals may be determined or detected. In such case, the circuit of FIG. 10 may be utilized in the wave analyzer of FIG. 9, which may then be utilized as the vertical wave analyzer 58 of the system of FIG. 5.

The horizontal wave analyzer 56 (FIG. 5) thus provides increasing detected signals PH1 to PH*n* and decreasing detected signals NH1 to NH*n*. The vertical wave analyzer 58 (FIG. 5) provides increasing detected signals PV and decreasing detected signals NV. In FIG. 5, the increasing and decreasing horizontal detected signals PH1 to PH*n* and NH1 to NH*n* are supplied from the horizontal wave analyzer 56 to the switch 63 via the lead 65. The switch 63 functions to vary the indicating point so that the various detected scanning signals may be indicated. The switch 63 thus switches the increasing and detecting horizontal detected signals PH1 to PH*n* and NH1 to NH*n* successively at exactly the same rate as the vertical scanning switch 8 provides the vertical scanning signals.

FIG. 11 shows a switch circuit which may be utilized as the switch 63 of the system of FIG. 5. In FIG. 11, the horizontal detected signals, increasing and decreasing, from the horizontal wave analyzer 56 (FIG. 5) are supplied to a plurality of input terminals 115*a* to 115*n*, as indicated in FIG. 11. The switching pulses produced by the pulse distributor 53 of FIG. 5 are supplied to a plurality of input terminals 116*a* to 116*n*.

The input terminals 115*a* and 116*a* are connected to the inputs of an AND gate 117*b* (not shown), and so on, and the input terminals 115*n* and 116*n* are connected to the inputs of an AND gate 117*n*.

The outputs of the plurality of AND gates 117*a* to 117*n* are connected to the inputs of an OR gate 11 via a plurality of leads 119*a* to 119*n*, as shown in FIG. 11. An output terminal 121 is connected to the output of the OR gate 118. The switch 63 provides the constant positive horizontal magnitude signals P*h* and the constant negative horizontal magnitude signals N*h* at the output terminal 121 of FIG. 11. The constant positive and negative horizontal magnitude signals P*h* and N*h* are provided by successively switching the increasing and decreasing horizontal detected signals PH1 to PH*n* and NH1 TO NH*n* and utilizing a scanning line pattern 122, as shown in FIG. 12.

The slope of a line segment of the pattern being scanned may be indicated by combining the constant positive and negative horizontal magnitude signals P*h* and N*h* and by combining the constant positive and negative vertical magnitude signals P*v* and N*v* provided by the vertical wave analyzer 58. The positive and negative horizontal magnitude signals P*h* and N*h* are supplied to inputs of a line classifying circuit 123 via a lead 124 (FIG. 5). The positive and negative vertical magnitude signals P*v* and N*v* are supplied to other inputs of the line classifying circuit 123 via a lead 125 (FIG. 5). The switching pulses produced by the pulse distributor 55 are supplied to still other inputs of the line classifying circuit 123 via a lead 126 (FIG. 5). In FIG. 5, an output terminal 127 is connected to the output of the line classifying circuit 123 via a lead 128.

FIGS. 13*a* and 13*b* 14*a* *14b*, 15*a* and 15*b* and 16*a* and 16*b* illustrate patterns having positive sloping line, negative sloping lines, horizontal lines and vertical lines (FIGS. 13*a*, 14*a*, 15*a* and 16*a*) and circuits for indicating such lines (FIGS. 13*b*, 14*b*, 15*b* and 16*b*). FIG. 13*a* discloses a pattern having a negative sloping line. When the area 131 of the pattern of FIG. 13*a* is being scanned, both the horizontal and vertical scanning signals are increasing. When the area 132 of the pattern of FIG. 13*a* is being scanned, both the horizontal and vertical scanning signals are decreasing. The negative sloping line is detected or determined by the logical operation $$[Ph \cup Pv] \cup [Nh \cap Nv] = NSL$$

which is undertaken by the switching circuit of FIG. *13b*.The switching circuit of FIG. 13*b* comprises a pair of AND gates 133 and 134 and an OR gate 135, as shown.

FIG. 14*a* discloses a pattern having a positive sloping line. The positive sloping line is detected or determined by essentially the same logical operation as the negative sloping line. The logical operation for the positive sloping line is undertaken by the switching circuit of FIG. 14*b*, which comprises a pair of AND gates 136 and 137 and an OR gate 138, as shown.

FIG. 15*a* discloses a pattern having a horizontal line. When the areas of the horizontal line segments of the pattern of FIG. 15*a* are being scanned, there are no steep increases or decreases in the horizontal scanning signals and there are no steep increases or decreases in the vertical scanning signals. The horizontal line is detected or determined by the logical operation $$[Pv \cup Nv] \cap [\overline{Ph} \cap \overline{Nh}] = HL$$

which is undertaken by the switching circuit of FIG. 15*b*.

In FIG. 15*b*, the signals P*v* and N*v* are supplied to the inputs of an OR gate 139 via input terminals 141 and 142, respectively. The output of the OR gate 139 is connected to an input of an AND gate 143 via a lead 144. The signal P*h* is supplied to an input of the AND gate 143 via an input terminal 145 and an inverter 146. The signal N*h* is supplied to an input of the AND gate 143 via an input terminal 147 and an inverter 148.

FIG. 16*a* discloses a pattern having a vertical line. The vertical line is detected or determined by essentially the same logical operation as the horizontal line. The logical operation for the vertical line is undertaken by the switching circuit of FIG. 16*b*, which comprises an OR gate 149, an AND gate 151 and a pair of inverters 152 and 153.

Each of the switching circuits 15*b* and 16*b* may operate erroneously. Thus, the switching circuit of FIG. 15*b* may provide a horizontal line indicating signal at its output terminal 154 although the area being scanned is oblique. In a similar manner, the switching circuit of FIG. 16*b* may provide a vertical line indicating signal at its output terminal 155 although the area being scanned is oblique. Thus, for example, when the scanning point approaches the leading or front edge of the negative sloping line pattern of FIG. 13*a*, both the vertical and horizontal scanning signals have steep increases, so that the positive vertical and horizontal magnitude signals P*v* and P*h* may be provided with the waveforms shown in FIGS. 17*a* and 17*b*, respectively.

When the scanning point is so positioned that the positive vertical and horizontal magnitude signals P*v* and P*h* (FIGS. 17*a* and 17*b*) are coincident, the negative sloping line signal NSL, as shown in FIG. 17*c*, is provided. When the scanning point is so positioned that only one of the vertical and horizontal magnitude signals P*h* and P*h* is detected or determined and the other of said signals is not detected, the horizontal line signal HL (FIG. 17*d*) and the vertical line signal VL (FIG. 17*e*) are provided, so that the operation is erroneous. Such erroneous operation is due to the failure of the increasing positive vertical and horizontal magnitude signals P*v* and P*h* to coincide completely. Thus, when the actual pattern is scanned, erroneous operation occurs for various reasons such as, for example, incomplete printing of the pattern on the sheet.

FIG. 18 shows a line classifying circuit which may be utilized as the line classifying circuit 123 of the system of FIG. 5. The line classifying circuit of FIG. 18 does not operate erroneously, as do the switching circuits of FIGS. 15*b* and 16*b*. The circuit of FIG. 18 functions in a manner wherein when an oblique line segment is scanned, no horizontal line signal HL is provided, although a horizontal line is adjacent the oblique line segment. Since the vertical line detecting circuit operates in exactly the same manner as the horizontal line detecting circuit, only the horizontal line detecting operation is described hereinafter.

In FIG. 18, the positive vertical magnitude signal P*v* is supplied to an input of an OR gate 156 via an input terminal 157 and the negative vertical magnitude signal N*v* is supplied to another input of said OR gate via an input terminal 158. The negative sloping line signal NSL is supplied to an input of an OR gate 159 via an input terminal 161 and the positive sloping line PSL is supplied to another input of said OR gate via an input terminal 162.

If it is assumed, for example, that the scanning point passes the front or leading edge of the negative sloping line pattern of FIG. 13*a*, the positive vertical magnitude signal N*v* has a value of "O." The negative sloping line NSL has a value of "1" and the positive sloping line PSL has a value of "0." The output of the OR gate 156 is connected to the reset input of a flip-flop 163 via a lead 164, a lead 165, an inverter 166 and a lead 167. The output of the OR gate 156 is connected to an input of an AND gate 168 via the lead 164 and a lead 169.

The output of the OR gate 159 is connected to the set input of the flip-flop 163 via a lead 171 and a lead 172. The output of the OR gate 159 is connected to the input of a reset amplifier 173 via the lead 171 and a lead 174. The reset output of the flip-flop 163 is connected to another input of the AND gate 168 via a lead 175. The output of the AND gate 168 is connected to the set input of a flip-flop 176*a* of a shift register 177 via leads 178 and 179. The output of the AND gate 168 is connected to the reset input of the flip-flop 176*a* of the shift register 177 via a lead 181, an inverter 182 and a lead 183.

The output of the reset amplifier 173 is connected to each of the flip-flops 176*a*, 176*b*, 176*c* and 176*d* of the shift register 177 via a lead 184. The switching pulses from the pulse distributor 55 (FIG. 5) are supplied to each of the flip-flops 176*a* 176*6*, 176*c* and 176*d* of the shift register 177 via the lead 126, an input terminal 185 and a lead 186.

If the positive vertical magnitude signal P*v* attains a value of "1" prior to the negative sloping signal NSL, the flip-flop 163 is switched to its reset condition and said flip-flop switches the AND gate 168 to its conductive condition. The AND gate 168 thus transfers the positive vertical magnitude signal Pv to the shift register 177. The switching pulses supplied from the pulse distributor 55 (FIG. 5) shift the contents of the shift register 177 synchronously with the scanning point in the vertical direction.

If the negative sloping line signal NSL is then supplied to the input terminal 161, the contents of the shift register 177 are reset by the reset amplifier 173 as long as said signal is supplied. Simultaneously, the flip-flop 163 is switched to its set condition by the negative sloping line signal NSL and said flip-flop causes the AND gate 168 to be switched to its nonconductive condition.

The positive vertical magnitude signal Pv is either terminated prior or subsequent to the termination of the negative sloping line signal NSL. If the positive vertical magnitude signal Pv is terminated prior to or at the same time as the termination of the negative sloping line signal NSL, and if the shift register 177 is adapted to accommodate said signal Pv prior to the supply of said signal NSL, said signal Pv is completely eliminated in said shift register and the said signal Pv is not indicated at the output terminal 127. At such time, the flip-flop 163 is switched to its reset condition by the trailing edge of the positive vertical magnitude signal Pv, so that said flip-flop is returned to its initial condition.

If the positive vertical magnitude signal Pv is terminated subsequent to the termination of the negative sloping line signal NSL, that portion of said signal Pv prior to the trailing edge of said signal NSL is eliminated in the shift register 177 and the remaining portion of said signal Pv subsequent to the trailing edge of said signal NSL, is blocked at the AND gate 168. Even after the termination of the negative sloping line signal, the flip-flop 163 remains in its set condition, and the AND gate 168 remains in its nonconductive condition. When the positive vertical magnitude signal Pv is terminated, the flip-flop 163 is switched to its reset condition by the trailing edge of said signal Pv, so that said flip-flop is returned to its initial condition. Thus, when the negative sloping line signal NSL is supplied, the horizontal line signal HL adjacent said signal NSL, is eliminated.

The same principle as that explained is applicable in other cases. When there is a vertical line signal *VL*, such signal is eliminated when an adjacent oblique line signal is supplied. The characteristics of the line segment scanned are thus accurately and correctly indicated.

While the invention has been described by means of specific examples and in a specific embodiment, we do not wish to be limited thereto, for obvious modifications will occur to those skilled in the art without departing from the spirit and scope of the invention.

We claim:

1. A system for providing features of lines in a pattern comprising:

a plurality of detecting elements positioned linearly;
moving means for moving a pattern with respect to said detecting elements;
first circuit means connected to said detecting elements for deriving the output signals of said detecting elements as scanning signals for the direction of movement of the pattern;
switch means coupled to said detecting elements for providing scanning signals for a direction at right angles to the direction of movement of the pattern by cyclically switching said scanning signals at high speed;
first wave analyzer means connected to said first circuit means for detecting the increases and decreases of said scanning signals for the direction of movement of the pattern;
second wave analyzer means connected to said switch means for detecting the increases and decreases of said scanning signals for a direction at right angles to the direction of movement of the pattern;
second circuit means coupled to both said wave analyzer means for combining the output signals of both said wave analyzer means and for determining the slopes of lines constituting said pattern, said second circuit means including first determining means for logically combining the output signals of both said wave analyzer means and for determining that the slopes of lines constituting the pattern are oblique, and second determining means for determining that the slops of lines constituting the pattern are horizontal or vertical, said second determining means including shift register means set by part of the output signals of both said wave analyzer means and reset by the output signals of said determining means and blocking means for blocking that part of the output signals of both said wave analyzer means which sets the shift register means during the continuation of the output signals of the first determining means.